United States Patent [19]

Spitz et al.

[11] Patent Number: 5,439,662
[45] Date of Patent: Aug. 8, 1995

[54] PROCESS FOR MAKING MGCL$_2$MGO WITH NARROW GRANULOMETRIC DISTRIBUTION, CATALYTIC COMPONENTS CONTAINING THE SAME, PROCESS OF USING SUCH SUPPORTS TO POLYMERIZE OLEFINS, AND RESULTANT POLYOLEFINS

[75] Inventors: Roger Spitz, St. Symphorien d'Ozon; Maryse Patin, Villeurbanne; Claude Brun, Idron, all of France

[73] Assignee: Elf Atochem S.A., France

[21] Appl. No.: 6,621

[22] Filed: Jan. 21, 1993

[30] Foreign Application Priority Data

Jan. 27, 1992 [FR] France .................. 92 00820

[51] Int. Cl.$^6$ ............................... C01F 1/00
[52] U.S. Cl. ...................... 423/497; 23/304; 502/103; 502/107; 502/125; 502/226; 526/124; 526/125
[58] Field of Search .......... 423/161, 178, 497; 502/107, 103, 226, 125; 23/304; 526/124, 125

[56] References Cited

U.S. PATENT DOCUMENTS

| | | | |
|---|---|---|---|
| 4,410,451 | 10/1983 | Dietz et al. | 502/110 |
| 4,421,674 | 12/1983 | Invernizzi et al. | 502/154 |
| 4,843,049 | 6/1989 | Invernizzi et al. | 502/9 |
| 4,855,271 | 8/1989 | McDaniel et al. | 502/107 |
| 4,948,770 | 8/1990 | Job | 502/107 |
| 5,212,133 | 5/1993 | Duranel et al. | 502/134 |

FOREIGN PATENT DOCUMENTS

| | | |
|---|---|---|
| 449673 | 10/1991 | European Pat. Off. |
| 1559172 | 1/1980 | United Kingdom |
| 9009402 | 8/1990 | WIPO |

*Primary Examiner*—Romulo H. Delmendo
*Attorney, Agent, or Firm*—John L. Sigalos

[57] ABSTRACT

A process for the manufacture of MgCl$_2$.MgO with narrow granulometric distribution by treatment of hydrated MgCl$_2$ with an alcohol followed by heat treatment after partial elimination of the alcohol, characterized in that the hydrated MgCl$_2$ is suspended in the alcohol, and that the molar ratio of the alcohol to the hydrated MgCl$_2$ is lower than the solutility ratio of these two substances at the temperature of the suspension. The resultant MgCl$_2$.MgO can be employed as a support in catalytic components for the polymerization of olefins.

3 Claims, No Drawings

PROCESS FOR MAKING MGCL2MGO WITH NARROW GRANULOMETRIC DISTRIBUTION, CATALYTIC COMPONENTS CONTAINING THE SAME, PROCESS OF USING SUCH SUPPORTS TO POLYMERIZE OLEFINS, AND RESULTANT POLYOLEFINS

BACKGROUND OF THE INVENTION

The present invention pertains to a process for the manufacture of $MgCl_2.MgO$ with narrow granulometric distribution by treatment of hydrated $MgCl_2$ in an alcohol. The treatment induces the granulometric rearrangement of the particles of the initial hydrated $MgCl_2$. The most noteworthy phenomena occurring during the granulometric rearrangement are the disappearance of the fine particles and the disappearance of the large particles of the initial hydrated $MgCl_2$ with the appearance of particles whose granulometric distribution is narrow.

The resultant $MgCl_2.MgO$ can be employed as a catalytic support, especially in catalytic components of the Ziegler-Natta type. These catalytic components used in the polymerization of olefins have the advantage of producing polymers with a narrow particle-size distribution, for which reason such polymers have excellent application qualities.

Treatment of $MgCl_2.MgO$ supports in the presence of hydroxylated compounds is known, e.g., from GB 1,559,172, but all of these known cases solely involve forming complexes with hydroxyl functions, without concern for the granulometric distribution of the final product. In accordance with all of these treatments, the final complex remains essentially identical to the initial $MgCl_2.MgO$ with its fine and large particles.

SUMMARY OF THE INVENTION

The particles of $MgCl_2.MgO$ are obtained by treatment of hydrated $MgCl_2$ with an alcohol followed by heat treatment after partial elimination of the alcohol, with the procedure being characterized by the suspension of the hydrated $MgCl_2$ in the alcohol with the molar ratio of the alcohol to the hydrated $MgCl_2$ being lower than the solubility ratio of these two substances at the temperature of the suspension. In accordance with the procedure, it is indispensable that the $MgCl_2$ remain in suspension in the $MgCl_2$-supersaturated alcohol. Under these conditions, it is recommended that the medium remain biphasic and such that it contains sufficient alcohol for maintaining the $MgCl_2$ in suspension.

DETAILED DESCRIPTION

The alcohol suitable for the process is selected from among the straight or branched chain monoalcohols with 4 to 16 carbons.

Under the recommended operating condition, the suspension is effected in the conventional manner by bringing the alcohol into contact, preferably under agitation, with hydrated $MgCl_2$ of any structure. The $MgCl_2$ is maintained in suspension for the amount of time, generally more than 3 hours, required for the complete swelling of the particles in the alcohol. So as to obtain the best results, it is recommended to operate during the entire implementation of the procedure essentially at a temperature from 0° to 150°, preferably from 60° to 120° C., since, as was previously stated, the $MgCl_2$ must remain in suspension in the supersaturated alcohol.

After completion of this particle rearrangement operation, the hydrated $MgCl_2$ particles in suspension are separated from the $MgCl_2$-saturated alcohol, preferably washed, e.g., with a hydrocarbon, and preferably dried before being heat treated at a temperature generally between 300° C. and 600° C. so as to form $MgCl_2.MgO$ without destroying the granulometric rearrangement. The drying treatment is usually performed under vacuum or on a fluidized bed in a previously dried inert gas medium.

The resultant $MgCl_2.MgO$ usually contains from 15 to 40% by weight of MgO. The mean size of the $MgCl_2.MgO$ particles is generally from 5 to 200 $\mu m$, preferably from 10 to 120 $\mu m$, for a narrow granulometric distribution. The breadth of the granulometric distribution, expressed as is usually lower than 9 and more generally lower than 7. D90 is the diameter below which are 90% by mass of the particle diameters and D10 is the diameter below which are 10% by mass of the particle diameters.

The initial hydrated $MgCl_2$ is a $MgCl_2.xHOH$, with $0.3 \leq x \leq 12$. This hydrated $MgCl_2$ is usually a commercial $MgCl_2.6HOH$ or is obtained by hydrating or dehydrating this commercial $MgCl_2.6HOH$.

A catalytic component of a Ziegler-Natta type catalyst can be produced essentially by combination of the $MgCl_2.MgO$ according to the invention with a transition metal compound. Thus, such a component can be produced by depositing on the $MgCl_2.MgO$ a compound of titanium, vanadium, zirconium and/or hafnium, preferably halogenated, and more specifically $TiCl_4$, $TiCl_3$, $TiCl_n(OR)_{4-n}$ with $0 \leq n \leq 3$ and R representing a saturated hydrocarbon radical with 1 to 12 carbons, $VCl_3$, $VCl_4$ or $VOCl_3$, $HfCl_4$ or $ZrCl_4$. This catalytic component, associated with a cocatalyst selected from among the organometallic compounds of metals I to III of the Periodic Table, more specifically the compounds of aluminum, functions as a polymerization or copolymerization catalyst for straight or branched chain olefins such as ethylene, propylene, butene-1, hexene-1, octane-1, 4-methyl-1-pentene, 1,3-butadiene and 1,9-decadiene.

At least one electron donor can be added to the catalytic component during its manufacture and/or to the cocatalyst. This electron donor can be selected, e.g., from among the Lewis bases, the esters and polyesters of oxygenated acids, the ethers and polyethers, the amines, silicon compounds such as the silanes and alkylalkoxysilanes of formula $SiR_1R_2(OR)_2$, $SiR_1(OR)_3$ or $SiR_1R_2R_3(OR)$ in which the various R values are hydrocarbon radicals with 1 to 12 carbon atoms and phosphorus compounds such as phosphate and the phosphonates, with the preferred compounds being the alkyl esters or polyesters of aromatic acids, the alkyl mono- or diethers, and the alkoxysilanes and the alkylalkoxysilanes.

The catalyst produced from a component manufactured from the $MgCl_2.MgO$ of the invention can be used for all types of olefins polymerizations: high or low pressure, suspension, gas-phase or mass polymerization.

The size of the catalytic component particles and their narrow granulometric distribution are comparable to those of the $MgCl_2$ MgO according to the invention used as support.

The catalytic component can be advantageously prepared by impregnation, in a known manner, of the MgCl$_2$.MgO particles by a transition metal compound in liquid state or in solution containing one or more halogen atoms, especially chlorine atoms. Prior to this impregnation or simultaneously with this impregnation, it can be recommended to carry out the deposition of at least one of the previously cited electron donors.

The resultant catalytic component, associated with a conventional cocatalyst usually selected from among the organaluminum compounds such as the aluminoxanes, the aluminosiloxanes, the compounds with Al—R—Al bonds in which R represents an alkyl group, or of formula AlX$_q$R's in which X represents Cl or OR' with R' designating a C$_1$ to C$_{16}$, preferably C$_1$ to C$_{12}$, alkyl radical while q and s are numbers such that $1 \leq s \leq 3$, $0 \leq q \leq 2$, with $q+s=3$, forms a catalyst suitable for the polymerization of olefins, most especially for the polymerization of ethylene, propylene, butene-1, 4-methyl-1-pentene and hexene-1, octene, 1,3-butadiene, or mixtures thereof. It is not excluded to associated with the cocatalyst at least one of the electron donors as previously defined. The catalytic component and the cocatalyst are associated in proportions such that a the molar ratio of the aluminum contained in the cocatalyst to the transition metal of the said component is between 0.5 and 2000, preferably between 1 and 1000.

The polymerization of the aforementioned olefins, or C$_2$ to C$_{12}$ olefins in general, individually or in mixtures, using the previously defined catalytic system can be implementd in solution or in suspension in an inert liquid medium, notably in an aliphatic hydrocarbon such as n-heptane, n-hexane, isohexane, isobutane, or in mass in at least one of the olefins to be polymerized with said olefin(s) maintained in the liquid or hypercritical state.

The operating conditions, notably temperatures, pressures and amount of catalytic system, for these liquid-phase polymerizations are those usually proposed for similar cases using conventional supported or unsupported Ziegler-Natta type catalytic systems.

For example, polymerization carried out in suspension in solution in an inert liquid medium can be performed at temperatures up to 250° C. and under pressures from atmospheric pressure up to 250 bars. In the case of polymerization in liquid propylene medium, the temperatures can be as high as the critical temperature and the pressures can be between atmospheric pressure and the critical pressure. For mass polymerization or copolymerization of ethylene producing polyethylene or copolymers which are predominantly ethylene, it is possible to operate temperatures between 130° C. and 350° C. and under pressures between 200 and 3500 bars.

The catalytic system produced by association of the transition metal component according to the invention with a cocatalyst and possibly an electron donor as previously defined can also be used for the gas-phase polymerization of the previously cited olefins or mixtures thereof. Specifically, it is possible to carry out gas-phase polymerization in contact with the said catalytic system of a mixture of ethylene or propylene and one or more C$_2$ to C$_{12}$ olefins such as ethylene, propylene, butene-1, hexene-1, 4-methyl-1-pentene and 1-octene, containing, when it is in contact with the catalytic system, a molar proportion of C$_2$ to C$_{12}$ comonomers between 0.1 and 90%, preferably between 1 and 60%.

Gas-phase polymerization of an olefin or olefins in contact with the catalytic system can be carried out in any reactor designed for gas-phase polymerization, especially in an agitated and/or fluidized bed reactor.

The gas-phase polymerization operating conditions, notably temperature, pressure, injection of the olefin or olefins into the agitated and/or fluidized bed reactor, control of the polymerization temperature and pressure, are similar to those proposed in the prior art for gas-phase polymerization of olefins. Operations are generally performed at a temperature lower than the melting point (MP) of the polymer or copolymer to be synthesized, more specifically between +20° C. and (MP-5)°C., and under a pressure such that the olefin or olefins, and possibly the other hydrocarbon monomers present in the reactor, are essentially in vapor phase.

Polymerization in solution, in suspension, in mass or in gas phase can be performed in the presence of a chain-transfer agent so as to control the fluidity index of the polymer or copolymer to be produced. The preferred chain-transfer agent is hydrogen, which is used in an amount up to 90%, preferably between 0.1 and 60%, of the volume of the combined olefins and hydrogen brought into the reactor.

The transition metal component according to the invention can also be used for the preparation of an active prepolymer, which can be used alone or in association with a cocatalyst selected from among the previously defined aluminum compounds.

The said active prepolymer is produced by bringing one or more C$_2$ to C$_{12}$ alpha-olefins into contact with a catalytic system formed by associating the transition metal component according to the invention with a cocatalyst selected from among the compounds cited above for this purpose and employed in the previously specified proportions, with the said C$_2$ to C$_{12}$ olefins being used in amounts representing 2 to 500 grams, preferably 2 to 100 grams, of the C$_2$ to C$_{12}$ olefins per gram of the transition metal component.

The catalytic component according to the invention is particularly valuable in the polymerization or copolymerization of ethylene or propylene or their mixtures with each other or with another olefin, in that the catalytic component makes it possible to produce polymers or copolymers with narrow granulometric distribution without fine particles, with good flowability and a fluidity index suitable for the usual applications.

the resultant polyolefins or olefin copolymers are constituted of particles the mean size of which is generally between 100 and 2000 μm, more specifically between 200 and 1500 μm. Usually, the breadth of the granulomeric distribution of the powders is lower than 10, more generally lower than 8, and their apparent density (AD), measured according to ASTM Standard D1895—Method A, is generally between 0.3 and 0.6 g/cm$^3$.

The following nonlimitative examples illustrate the invention.

EXAMPLE 1

Under argon, 74.6 g of (MgCl$_2$.6HOH) are brought into contact with 55 mL of 2-ethylhexanol. The entirety is brought to 95° C. under agitation for 6 hours. After filtration, the resultant suspension is diluted with heptane, then washed four times, protected from air, with 100 mL of heptane. It is then dried under vacuum from room temperature to 40° C. Solid A is obtained.

33.9 g of solid A are subjected to heat treatment under vacuum at 300° C. for 2 hours, with the oven temperature being raised at the rate of 10° C./minute. This yields 15.3 g of solid B, comprised of MgCl$_2$.MgO containing 23% by weight of MgO.

The mean particle size is 72 μm and the value of is 5.6 before treatment; the respective values after the heat treatment are 71 μm and 5.1.

EXAMPLE 2

Under argon, 24.8 g of (MgCl$_2$.6HOH) are brought into contact with 21 mL of 2-ethylhexanol. The entirety is brought to 95° C. under agitation for 6 hours. The solid is washed four times, protected from air, with 100 mL of heptane and dried under vacuum from room temperature to 120° C. 10.3 g of this solid C are subjected to the following heat treatment under vacuum:

(i) temperature raised to 120° C. at the rate of 10° C./minute, (ii) temperature raised to 350° C. at the rate of 6° C./minute and held at 350° C. for 2 hours, and (iii) temperature raised to 450° C. at the rate of 10° C./minute and held at 450° C. for 30 minutes.

This yields 7.5 g of solid D, MgCl$_2$.MgO containing 34% by weight of MgO.

3.1 g of solid D are brought into contact, protected from air, with 20 mL of TiCl$_4$ for 2 hours at 90° C. After washing with 100 mL of heptane, the resultant solid is dried under vacuum at room temperature. The resultant solid E contains 2.1% by weight of titanium.

Catalytic component E is employed in suspension polymerization. The following are introduced, in the given order, at room temperature under an inert atmosphere into a one-liter stainless steel reactor equipped with blade agitation operating at 750 rpm: 500 mL of heptane, 3 mM of triisobutylaluminum and 70 mg of catalytic component E. Hydrogen is added until reaching a partial pressure of 1.9 bar and ethylene is added, ajusting the pressure so as to reach 8 bars absolute total pressure after heating at 80° C. This total pressure is maintained constant for 1 hour by addition of ethylene. At the end of one hour, the injection of ethylene is stopped and cooling to room temperature is implemented. The catalyst is deactivated by addition of a solution of methanol slightly acified by addition of 10% hydrochloric acid. The polymer suspension is filtered and then dried.

The apparent density of the polymer is 0.43 g/cm$^3$, the mean size of the polymer particles is 550 μm and the value of is 3.1.

EXAMPLE 3

Under argon, 27.1 g of (MgCl$_2$.6HOH) are brought into contact with 25 mL of 2-ethylhexanol. The entirety is brought to 95° C. under agitation for 6 hours. The resultant suspension is washed four times, protected from air, with 100 mL of heptane and then dried under vacuum from room temperature to 100° C.

The resultant solid is subjected to heat treatment under vacuum at 450° C. as described in Example 2. This yields 11.4 g of solid F, MgCl$_2$.MgO containing 17.5% by weight of MgO.

Catalytic component G is prepared under the conditions employed for component E in Example 2. This yields solid G, containing 2.4% by weight of titanium.

Catalytic component G is employed for suspension polymerization under the conditions used in Example 2, with 2.1 bars of hydrogen.

The apparent density of the polymer is 0.38 g/cm$^3$, the main size of the polymer particles is 211 μm and the value of is 6.3.

EXAMPLE 4

Comparative

Under argon, 10.4 g of (MgCl$_2$.6HOH) are brought into contact with 7.5 mL of tetrahydrofuran. The entirety is brought to 80° C. under agitation for 2 hours. The solvent is eliminated by decanting and siphoning. The resultant solid H is dried under vacuum from room temperature to 120° C.

Solid H is subjected to heat treatment under vacuum at 300° C. for 2 hours (oven temperature increase rate: 10° C./minute). This yields 5.0 g of solid I, MgCl$_2$ not containing a significant amount of MgO.

EXAMPLE 5

Comparative 19.2 g of (MgCl$_2$.6HOH) are subjected to heat treatment under vacuum at 500° C. for 2 hours (temperature increase rate of 10° C./minute). This yields 7.2 g of solid J, MgCl$_2$.MgO containing 35% by weight of MgO.

6.5 g of slid J are subjected to activation treatment by grinding under vacuum. The solid is ground for 8 hours in the presence of adamantane: 5% by weight in a mill containing steel balls. The resultant solid K is then washed three times with 100 mL of heptane.

Solid K is brought into contact, protected from air, with 40 mL of TiCl$_4$ for 2 hours at 80° C. The solid is then washed three times with 100 mL heptane. The resultant solid is dried under vacuum at room temperature. This yields are solid L containing 1.9% by weight of titanium.

Catalytic component L is employed in polymerization under the conditions described in Example 2, with trihexylaluminum and 3 bars of hydrogen.

The apparent density of the polymer is 0.38 g/cm$^3$, the mean size of the polymer particles is 180 μm and the value of is 15.

EXAMPLE 6

Under argon, 13.4 g of (MgCl$_2$.6HOH) are brought into contact with 12 mL of n-hexanol. The entirety is brought to 95° C. under agitation for 8 hours. The resultant suspension is washed four times, protected from air, with 100 mL of heptane and dried under vacuum from room temperature to 160° C.

The resultant solid is subjected to heat treatment under vacuum at 450° C. as described in Example 2. This yields 4.8 g of solid M, MgCl$_2$.MgO containing 40% by weight of MgO.

Catalytic component N is prepared under the conditions described for component E in Example 2. This yields solid N, containing 2.0% by weight of titanium.

Catalytic component N is employed is suspension polymerization under the conditions of Example 2, with 2 bars of hydrogen.

The apparent density of the polymer is 0.36 g/cm$^3$, the mean size of the polymer particles is 360 μm and the value of is 4.7.

While the invention has been described in connection with a preferred embodiment, it is not intended to limit the scope of the invention to the particular form set forth, but on the contrary, it is intended to cover such alternatives, modifications, and equivalents as may be included within the spirit and scope of the invention as defined by the appended claims.

What is claimed is:

1. A process for the manufacture of $MgCl_2 \cdot MgO$ with a granulometric distribution, expressed as D90/D10, lower than 9, comprising forming a suspension by suspending particles of $MgCl_2 \cdot xHOH$ wherein $0.3 \leq x \leq 12$ in an alcohol to form an $MgCl_2$-supersaturated alcohol medium, maintaining said suspension at a temperature of 0° C. to 150° C. to swell said particles, at least partially eliminating the alcohol, and heat treating said particles between 300° to 600° to form $MgCl_2 \cdot MgO$ without destroying the granulometric rearrangement.

2. The process of claim 1, wherein the alcohol is a straight or branched chain monohydric alcohol with 4 to 16 carbons.

3. The process of claim 2, characterized in that the $MgCl_2$ is maintained in suspension in the alcohol for more than 3 hours.

* * * * *